United States Patent [19]

Feller, Jr.

[11] Patent Number: 5,406,180
[45] Date of Patent: Apr. 11, 1995

[54] ELECTRIC MOTOR BRAKE

[75] Inventor: Raymond D. Feller, Jr., Franklin, Wis.

[73] Assignee: Johnson Service Company, Milwaukee, Wis.

[21] Appl. No.: 187,593

[22] Filed: Jan. 26, 1994

Related U.S. Application Data

[63] Continuation of Ser. No. 889,181, May 27, 1992, Pat. No. 5,306,989.

[51] Int. Cl.⁶ .......................................... H02K 7/102
[52] U.S. Cl. ...................................... 318/372; 310/77; 310/93; 188/171
[58] Field of Search ....................... 318/370, 371, 372; 310/76, 77, 92, 93, 120, 123; 188/166, 171

[56] References Cited

U.S. PATENT DOCUMENTS

| | | |
|---|---|---|
| 736,461 | 8/1903 | Thresher . |
| 2,209,236 | 7/1940 | Rowell . |
| 3,110,830 | 11/1963 | Smith . |
| 3,626,220 | 12/1971 | Niculescu . |
| 3,659,170 | 4/1972 | Burkett et al. . |
| 3,822,768 | 7/1974 | Sebulke . |
| 4,103,763 | 8/1978 | Glockner et al. . |
| 4,482,847 | 11/1984 | Rudich, Jr. et al. . |
| 4,734,604 | 3/1988 | Sontheimer et al. . |
| 4,877,987 | 10/1989 | Flaig et al. . |
| 4,910,423 | 3/1990 | Werber . |
| 5,117,143 | 5/1992 | Iddings . |
| 5,121,018 | 6/1992 | Oldakowski . |

Primary Examiner—Bentsu Ro
Attorney, Agent, or Firm—Foley & Lardner

[57] ABSTRACT

The present invention provides an internal braking system for use with electric motors, particularly electric motors used with rotary actuators. The braking system includes a brake which has a spindle disposed at least partially between the rotor and a shaft. An annular engagement portion of the brake is integrally connected to the spindle through a conical portion. The brake is forced against a stationary friction member when the motor is de-energized. The brake is preferably made from a polymeric alloy having self-lubrication properties.

15 Claims, 3 Drawing Sheets

ELECTRIC MOTOR BRAKE

This is a continuation of U.S. Ser. No. 07/889,181, filed on May 27, 1992, now U.S. Pat. No. 5,306,989.

TECHNICAL FIELD

The present invention relates generally to an electric motor brake and more particularly to a brake which is connected to the rotor of an electric motor for impeding further rotation of the rotor when the electric motor is de-energized.

BACKGROUND OF THE INVENTION

Electric motors are used in numerous applications where it is necessary to brake the rotation of the rotor which rotates within. Whenever a motor is performing work which must be quickly stopped upon a given input, a braking system must be used to prevent the spinning rotor from excessive coasting once the current supply is interrupted and the electric motor is de-energized. This is particularly true when electric motors are used in conjunction with rotary actuators for controlling the position of devices coupled to an actuator, for example, valves, mechanical dampers, and the like, as employed in process control systems.

Process control systems frequently employ valves which may be adjusted for controlling the flow of fluids within a conductor system such as a pipeline. Other types of fluid flow control devices, often encountered in process control systems, include dampers which may be actuated for modulating the flow of gases. Process control systems, in which such a rotary actuator may be used, include heating, ventilating, and air conditioning (HVAC) systems which usually employ a plurality of air handling units comprising interconnected duct work which is associated with mechanical dampers. The duct work and dampers cooperate for controlling the flow of outside ambient air into a conditioned space, for controlling the flow of air from the space to the ambient, and for controlling air flow between cool and warm air ducts.

In the above-mentioned rotary actuator systems, a power transmission is typically connected with an electric motor. The motor provides the power to turn the transmission and thus actuate the damper, valve, etc. Often, the valve or damper movement must be carefully controlled so that when power to the electric motor is switched off, the various motor components will quit rotating as soon as possible. This will prevent movement of the valve or damper beyond the desired point. In such situations, it is desirable to provide a braking action to impede further coasting, i.e., rotation of motor components due to momentum. Once the electric motor is de-energized, a brake is activated to stop the rotation.

An electric motor of the type used in conjunction with actuators is disclosed in Rudich, Jr. et al., U.S. Pat. No. 4,482,847. Rudich, Jr. et al. discloses an actuator, the electric motor for driving the actuator, and a braking system for braking further rotation of the internal components of the electric motor once the electric motor is de-energized. The device disclosed in Rudich, Jr. et al. uses a brake member fixed to a rotor and rotatably mounted about a fixed shaft. The brake member could be made from steel and in some prior devices comprised at least two separate parts, a spindle and a brake plate.

When the rotor spindle was made from steel, lubrication was required between the spindle and the shaft. This lubrication, required for both rotary and sliding motion along the shaft, was provided by an oil bath. At times, rapid starting and stopping caused by electronic line noise resulted in an oscillatory sliding motion against the stationary hardened steel shaft causing rapid premature wear due to displacement of the oil lubrication film and the resultant friction. Also, since some prior art brake members used a separate plate assembled to the end of the steel rotor spindle, the two members tended to wobble due to manufacturing distortions.

The present invention addresses the foregoing drawbacks of known brake members used in conjunction with electric motors.

SUMMARY OF THE INVENTION

The present invention provides a brake system for use in an electric motor which can be energized or de-energized by supplying electric current to or interrupting current flow to the motor. The motor has a stator and a rotor which is mounted about a shaft in operative relationship with the stator. Both the stator and the rotor are mounted within a framework. The brake system comprises a brake member having a spindle and a brake disk proximate to a longitudinal end of the spindle. The brake disk is integral with the spindle and extends radially therefrom. The spindle is disposed at least partially between the shaft and the rotor.

A friction member is attached to the framework in a position proximate the brake disk and is configured for frictional engagement with the brake disk. A resilient member biases the brake disk laterally towards the friction member when the electric motor is de-energized. Thus, the resilient member moves the brake disk into contact with the friction member when current is no longer supplied to the electric motor. This contact impedes further rotation of the rotor.

BRIEF DESCRIPTION OF THE DRAWING

The invention will hereafter be described with reference to the accompany drawing, wherein like numerals denote like elements, and.

DETAILED DESCRIPTION OF A PREFERRED EMBODIMENT

Figures 1, 3, 4:
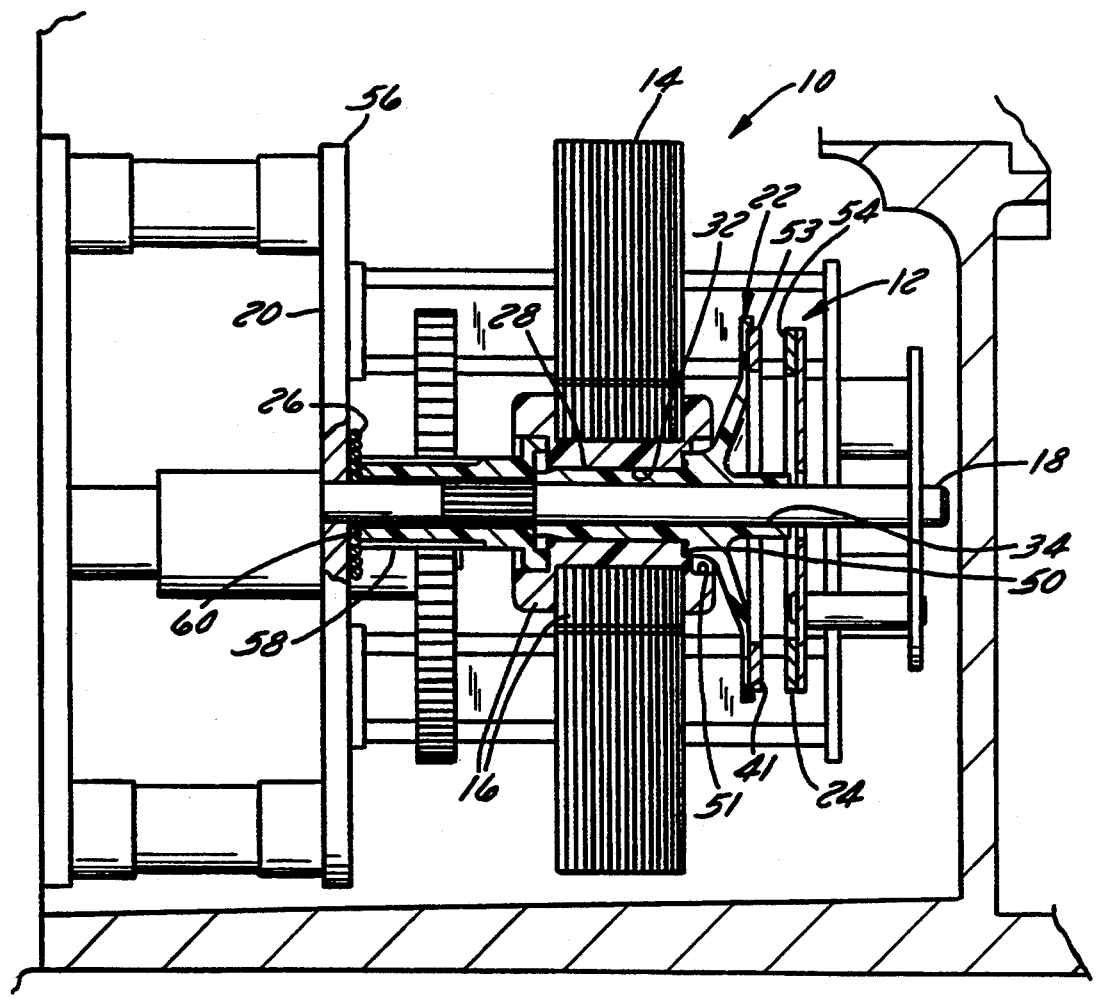
FIG. 1 is a cross-sectional view showing the rotor and brake system in the run position.
FIG. 3 is a perspective view of the brake member.
FIG. 4 is a cross-sectional view of the brake member taken generally along line 4—4 in FIG. 3.
Figure 2:
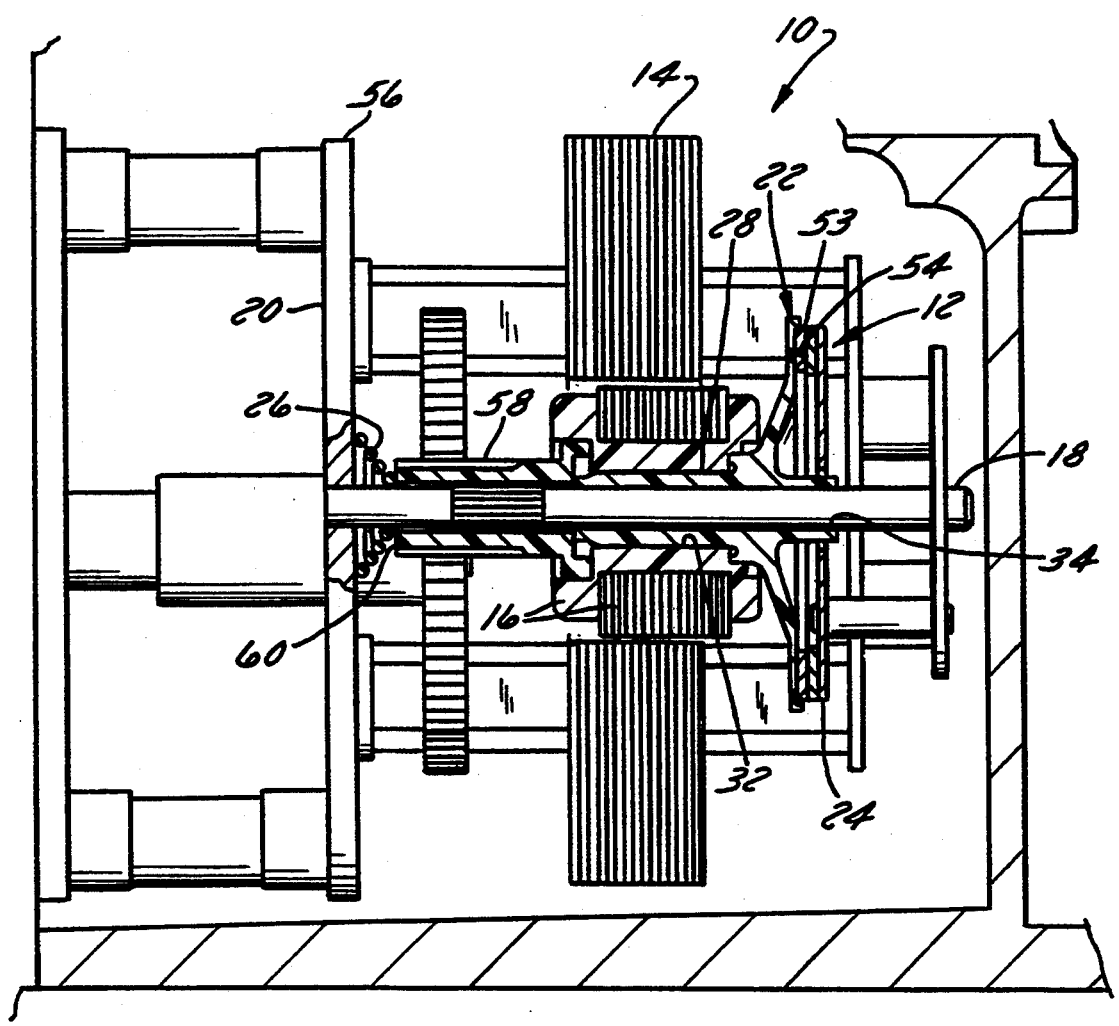
FIG. 2 is a cross-sectional view similar to that shown in FIG. 1, except that the motor is in the de-energized state and the brake is engaged.

Referring now to the Figures, an electric motor having an internal braking system is designated generally as 10. Motor 10 is shown to include a braking system 12, a stator 14, a rotor 16 operatively associated with stator 14, and a shaft 18 extending longitudinally through the rotor 16 and the stator 14. A framework 20 is disposed about the various components listed, to, among other things, provide support for shaft 18 and a mounting place for stator 14. Rotor 16 rotates within stator 14 when motor 10 is appropriately energized by an electric current.

Brake system 12 includes a brake member 22 which is affixed to rotor 16, a friction member 24 which is attached to framework 20 and positioned for engagement with brake member 22 when motor 10 is de-energized. A resilient member 26, operatively associated with brake member 22 and rotor 16, moves them laterally with respect to stator 14 when the motor 10 is de-energized.

Brake member 22 is affixed to rotor 16 and includes a spindle 28 and a brake disk 30 which is integral with spindle 28. Spindle 28 is generally circular in cross-section and is preferably press fit at least partially, into a bore 32 extending longitudinally through rotor 16. In a preferred embodiment, spindle 28 has a ribbed surface 33 which allows a broader range of dimensional interference when spindle 28 is press fit into bore 32. This compensates for different amounts of interference due to, for instance, changes in temperature. Spindle 28 can also be bonded to rotor 16 with an adhesive such as cyanacrolate. Ribbed surface 33 prevents the adhesive from being wiped off when spindle 28 is press fit into bore 32. Thus, spindle 28 is firmly affixed to and will move in synchronous rotation with rotor 16.

Spindle 28 includes a center bore 34 which extends longitudinally through it. In a preferred embodiment, center bore 34 is configured for rotatable engagement with shaft 18. Thus, both rotor 16 and spindle 28, which are affixed together, may simultaneously rotate about shaft 18. In this embodiment, center bore 34 also functions as a rotatable bearing surface. Ribbed surface 33 also prevents distortion of center bore 34 when spindle 28 is press fit into bore 32.

In an alternate embodiment, spindle 28 is affixed to shaft 18 and shaft 18 is rotatable instead of fixed. Shaft 18 is then mounted in bearings (not shown) according to methods which are known in the art. For example, each end of shaft 18 could be mounted in stationary bearings appropriately located in framework 20.

Brake disk 30 preferably extends radially outward from a first end 36 of spindle 28. End 36 extends outward of bore 32 in rotor 16, and brake disk 30 is disposed at a spaced distance from rotor 16.

Spindle 28 also includes an angled disk support portion 38 which extends between an annular engagement portion 40 of brake disk 30 and spindle 28. Annular engagement portion 40 includes an annular braking surface 41 for selective contact with friction member 24. Disk support portion 38 is shown to be generally conical in shape and spreads outward from spindle 28, away from rotor 16, and towards annular engagement portion 40. This shape provides brake disk 30 with great strength to withstand braking pressures. Preferably, disk support portion 38 includes a boss 42 mounted around spindle 28 adjacent rotor 16 and intermediate rotor 16 and annular engagement portion 40. Extending between boss 42 and annular engagement portion 40 is a support leg 44 which extends at an acute angle from the plane including annular engagement portion 40 and intersecting spindle 28. Thus, support leg 44 and boss 42 form a generally conical support portion 38. A recessed area 46 is disposed in the interior of conical support member 38 between spindle 28 and annular engagement portion 40.

Boss 42 includes an abutment surface 48 which abuts against a generally flat annular rotor surface 50 disposed at one of the longitudinal ends of bore 32. Rotor surface 50 is at the base of a recessed end 51 of rotor 16. An annular groove 52 is formed in boss 42 at abutment surface 48 and is disposed adjacent spindle 28. Annular groove 52 is designed to provide relief room for debris or shavings which may be produced when spindle 28 is press fit into bore 32 of rotor 16, thus promoting engagement between abutment surface 48 and rotor surface 50.

Spindle 28, annular engagement portion 40, and disk support portion 38 are preferably integrally formed as a single unit which has been generally referred to as brake member 22. In the most preferred embodiment, brake member 22 is made from a material which includes a polymer alloy that has self-lubrication properties such as acetal homopolymer with glass beads and polytetrafluoroethylene (PTFE) mixed throughout the acetal homopolymer. In a most preferred embodiment, the brake member material includes 20% glass beads and 15% PTFE (supplied by ICI as Lubricomp KBL 4034).

Brake member 22 may also include a friction ring 53 attached to outer radial portion 40 on the side which is adapted to engage friction member 24. Friction member 24 is affixed to framework 20 and includes a mating friction surface 54 for contact with ring 53 when electric motor 10 is de-energized and resilient member 26 moves brake member 22 longitudinally. When friction ring 53 engages friction surface 54, brake member 22 and rotor 16 are quickly slowed to a stop.

Resilient member 26 is preferably a coil spring disposed over shaft 18 on an opposite side of stator 14 from friction member 24. In the illustrated embodiment, resilient member 26 is disposed between a stationary interior wall 56 of framework 20 and a pinion gear 58. Pinion gear 58 is slidably and rotatably mounted over shaft 18 and is configured for connection with the actuator transmission (not shown). Pinion gear 58 is affixed to rotor 16 and brake member 22, thus rotating about shaft 18 in sync with rotor 16. Resilient member 26, when compressed, exerts pressure against a flange 60 on the distal end of pinion gear 58 biasing pinion gear 58, rotor 16, and brake member 22 towards friction member 24. Thus, when electric motor 10 is de-energized so that the magnetic field no longer holds rotor 16 in alignment with stator 14, resilient member 26 pushes against flange 60 moving rotor 16 laterally along shaft 18 and moving brake disk 30 into contact with friction member 24. When current is supplied to motor 10, the magnetic forces created between stator 14 and rotor 16 move rotor 16 laterally along shaft 18 in the opposite direction so that brake disk 30 is disengaged from friction member 24. In this position, rotor 16, brake member 22, and pinion gear 58 can freely rotate about shaft 18. Also, in this position, resilient member 26 is compressed between flange 60 and interior wall 56 thus providing the biasing force necessary to once again move brake disk 30 into contact with friction member 24 when motor 10 is de-energized.

The material and configuration of brake member 22 allows this electric motor braking system to function more consistently over a longer life without the need of external lubrication. The polymeric alloy used in brake member 22 provides self-lubrication. In addition, bearings previously used between spindle 28 and shaft 18 can be eliminated. Brake member 22 simply rotates about shaft 18 providing its own bearing surface. Moreover, the configuration of braking member 22 ensures that it can be constructed of lightweight material and still have the structural rigidity to withstand the braking pressures exerted when resilient member 26 forces brake disk 30 into contact with friction member 24. The polymeric alloy permits molding brake member 22 as a single unit. By using a molded part, greater consistency can be obtained in manufacturing brake members 22. This prevents the problems encountered when, for instance, separate brake disks where attached to spindles leading to undesirable wobble.

Figure 5:
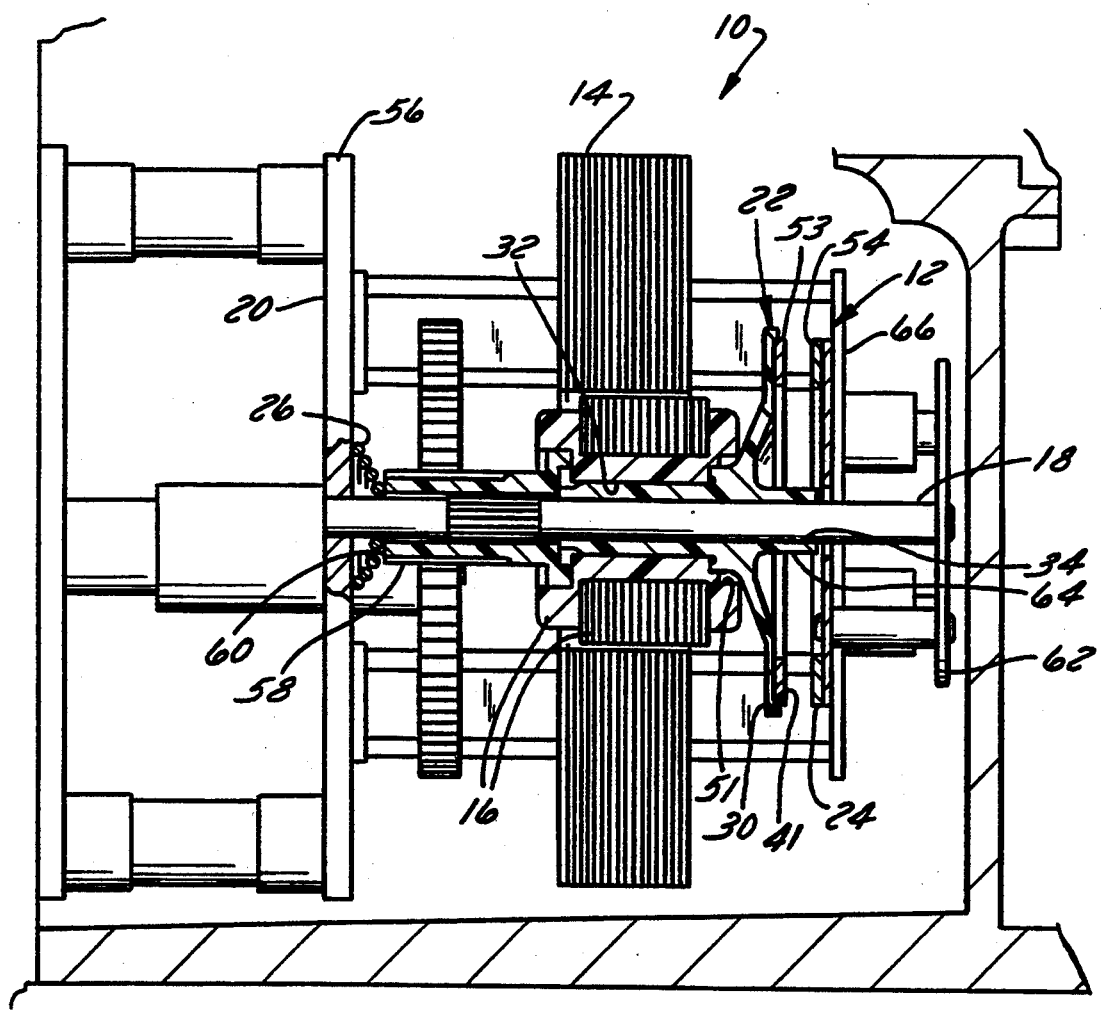
FIG. 5 shows an alternate embodiment of the invention which allows the brake to be disengaged under various conditions.

In an alternate embodiment, framework 20 includes a movable portion 62 to which friction member 24 is attached. As shown in FIG. 5, portion 62 can be moved away from brake disk 30 to a retracted position where brake disk 30 can no longer contact friction member 24. In this retracted position, an extended hub 64 of brake member 22 prevents brake disk 30 from contacting friction member 24 when it abuts a fixed wall 66 of framework 20.

Preferably, movable portion 62 is actuated by solenoid coils which, when energized, hold movable portion 62 in a position where brake disk 30 can contact friction member 24. However, if power to the solenoid coils is interrupted, movable portion 62 moves to its retracted position preventing engagement of brake member 22 regardless of whether current is being supplied to motor 10. In the retracted position, rotor 16 can freely rotate about shaft 18. This allows the valves, dampers, etc., to which motor 10 is attached, to be freely moved without working against any braking effect. For example, if power to both motor 10 and the solenoid coils is interrupted, a valve connected to an actuator run by motor 10 can easily be closed.

It will be understood that the foregoing description is of preferred exemplary embodiments of this invention, and that the invention is not limited to the specific forms shown. For example, the preferred embodiment uses a stationary shaft, however, a rotatable shaft could also be used with appropriate modification. These and other modifications may be made in the design and arrangement of the elements without departing from the scope of the invention as expressed in the appended claims.

What is claimed is:

1. A brake assembly for use with an electric motor having a framework and a rotor mounted within the framework, the rotor being configured to rotate when an appropriate electric current is supplied to the motor, the brake assembly comprising:
    a stationary shaft non-rotatably attached to the framework;
    a brake member having a spindle portion to which the rotor is affixed, a disk portion extending radially outward from the spindle portion, and a longitudinal bore extending therethrough, the bore being sized to receive the stationary shaft and to permit rotation of the brake member thereabout;
    a framework portion having friction surface; and
    an actuator mechanism providing a generally longitudinally directed force against the brake member, wherein the actuator mechanism operates to move the brake member axially until the disk portion frictionally engages the friction surface when the electric current is interrupted.

2. The brake assembly of claim 1, wherein the actuator mechanism includes a coil spring mounted about the stationary shaft intermediate the framework and the spindle portion.

3. The brake assembly of claim 2, wherein the stationary shaft is also axially stationary and the brake member is configured to slide axially along the shaft.

4. The brake assembly of claim 3, wherein the spindle portion and the disk portion are integrally molded from a polymer alloy.

5. The brake assembly of claim 1, further comprising a ring of friction material attached to the disk portion and disposed for contact with the friction surface.

6. The brake assembly of claim 1, wherein the rotor includes a center bore into which the spindle portion is press fitted.

7. The brake assembly of claim 6, wherein the spindle portion includes external axially oriented ribs configured to contact the rotor when the spindle portion is pressed into the center bore.

8. A brake assembly for use with an electric motor having a framework and a rotor mounted within the framework, the rotor being configured to rotate when an appropriate electric current is supplied to the motor, the brake assembly comprising:
    a rotationally stationary shaft;
    a brake member having a spindle portion to which the rotor is affixed, a disk portion extending radially outward from the spindle portion, and a longitudinal bore extending therethrough, the bore being sized to receive the rotationally stationary shaft and to permit rotation of the brake member thereabout;
    a framework portion having a friction surface;
    an actuator mechanism providing a generally longitudinally directed force against the brake member, wherein the actuator mechanism operates to move the brake member axially until the disk portion frictionally engages the friction surface when the electric current is interrupted;
    wherein the actuator mechanism includes a coil spring mounted about the stationary shaft intermediate the framework and the spindle portion;
    wherein the rotationally stationary shaft is also axially stationary and the brake member is configured to slide axially along the shaft; and
    wherein the spindle portion and the disk portion are integrally molded from a polymer alloy including an acetal homopolymer and glass beads.

9. A brake member assembly for use with an electric actuator motor having a framework, a shaft supported in the framework along a longitudinal axis, a stator mounted about the longitudinal axis, and a rotor rotatably mounted about the longitudinal axis and having a center bore, the rotor being rotated when the electric actuator motor is supplied with an appropriate electric current, the brake member assembly comprising:
    a brake member having a spindle portion disposed at least partially within the rotor center bore and a friction disk extending radially outward from the spindle portion, the spindle portion and the friction disk being formed as a single unitary component from the same material, the spindle portion being affixed to the rotor and including a longitudinal bore for receiving the shaft therethrough; and
    an actuator mechanism disposed intermediate the framework and the unitary brake member, the actuator mechanism acting in response to an interruption in the supply of electric current to force the rotor and the unitary brake member in a direction parallel with the longitudinal axis until the friction disk contacts a portion of the framework, thereby inhibiting further rotation of the rotor.

10. The brake assembly of claim 9, wherein the actuator mechanism includes a coil spring mounted about the shaft.

11. The brake assembly of claim 9, wherein the unitary brake member rotates about the shaft.

12. The brake assembly of claim 11, wherein the spindle portion is press fit into the rotor center bore.

13. The brake assembly of claim 12, wherein the spindle portion includes longitudinal ridges to limit any distortion of the longitudinal bore when the spindle portion is press fit into the rotor center bore.

14. The brake assembly of claim 9, wherein the unitary brake member is molded from a polymer.

15. The brake assembly of claim 14, wherein the unitary brake member is molded from a polymer alloy including an acetal homopolymer.

* * * * *